(12) United States Patent
Slais

(10) Patent No.: US 6,199,261 B1
(45) Date of Patent: Mar. 13, 2001

(54) PRESSURE VESSEL AND METHOD OF MANUFACTURE THEREOF

(75) Inventor: Robert J. Slais, Bloomfield, MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/190,544

(22) Filed: Nov. 12, 1998

Related U.S. Application Data

(62) Division of application No. 08/721,829, filed on Sep. 27, 1996, now Pat. No. 5,855,293.

(51) Int. Cl.$^7$ .............................. B21D 39/00; B23P 6/00; B23P 17/00
(52) U.S. Cl. .......................... 29/516; 29/890.035; 29/422
(58) Field of Search .................................... 220/610, 612, 220/618, 621, 619; 228/112.1, 184, 136; 29/422, 890.035, 516

(56) References Cited

U.S. PATENT DOCUMENTS

| | | | |
|---|---|---|---|
| 2,257,697 | * | 9/1941 | McClary ................................ 220/67 |
| 2,388,300 | * | 11/1945 | Wackman ............................. 220/619 |
| 3,452,897 | * | 7/1969 | Anthony ................................ 220/67 |
| 3,779,446 | * | 12/1973 | Lemelson ............................. 228/15 |
| 4,675,971 | * | 6/1987 | Masserang ............................. 29/422 |
| 5,191,775 | * | 3/1993 | Shiina et al. ........................... 62/503 |
| 5,460,317 | * | 10/1995 | Thomas et al. .................. 228/112.1 |

* cited by examiner

*Primary Examiner*—I Cuda Rosenbaum
*Assistant Examiner*—Marc Jimenez
(74) *Attorney, Agent, or Firm*—Vanophem Meeham & Vanophem, P.C.

(57) ABSTRACT

A pressure vessel suitable for use in an automotive air-conditioning system includes a cylindrical body (10, 40) including an annular wall (14, 44). The cylindrical body preferably includes an opposite closed end, an initially opened end (12, 42), and a closure member (20, 50) inserted into the open end of the cylindrical body. The closure member and the cylindrical body each have extensions or annular flanges (28, 58) which are spin welded together. The cylindrical body is fused to the closure member when the annular flange (28, 58) of the closure member is spin welded to an annular, outermost portion (18, 48) of the cylindrical body. The closure member and the cylindrical body are further locked together by inwardly rolling a portion of the annular wall into an annular groove (30, 60) and an outermost surface of the closure member.

4 Claims, 3 Drawing Sheets

PRESSURE VESSEL AND METHOD OF MANUFACTURE THEREOF

CROSS REFERENCE TO RELATED APPLICATION

This is a divisional application of Ser. No. 08/721,829 now filed on Sep. 27, 1996 U.S. Pat. No. 5,855,293, issued Jan. 5, 1999.

BACKGROUND OF THE INVENTION

1. Field of the Invention

This invention relates to a pressure vessel and to a method of manufacturing the pressure vessel. More particularly, this invention relates to a pressure vessel of the type used in an automotive air conditioning system such as a refrigerant receiver or an accumulator dehydrator.

2. Description of the Prior Art

U.S. Pat. No. 5,191,775, (Shiina et al.) discloses a receiver of the type used in an automotive air conditioning system and a method for the manufacture of such receiver. The receiver of the Shiina et al. reference is composed of a generally cylindrical body having a thin annular wall, a first integral and unitary end, and a disk-shaped closure member, commonly referred to as a puck, inserted into an opposed open end of the cylindrical body. The closure member is secured to the cylindrical body, after insertion of a desiccant material or other elements of the receiver, as used in a refrigerant circuit, into the interior of the cylindrical body. Shiina et al. disclose that the open end of the cylindrical body is reshaped by electromagnetic forming, after insertion of the closure member, to closely conform the interior of the open end of the cylindrical body to the exterior of the closure member to thereby secure the closure member and the cylindrical body to one another. Shiina et al. teach that the closure member and cylindrical body are sealed using O-rings. Nevertheless, the assembly of the closure member and the cylindrical body to one another according to this reference does not result in a receiver that is pressure-tight, i.e., that it eliminates all leak paths for the molecules of refrigerant fluid. Consequently, the O-rings must be used between the exterior of the closure and the interior of the cylindrical body to retain the refrigerant fluid within the receiver of this reference.

U.S. Pat. No. 5,425,250, to Hutchinson et al., also discloses a receiver for an automotive air conditioning system that consists of a generally cylindrical aluminum body with a thin annular wall and an initially open end which is closed, after the insertion of a desiccant material or other elements into the cylindrical body, by a disk-shaped aluminum closure member, or puck, inserted into the open end of the cylindrical body. According to the Hutchinson et al. reference, the closure member is joined to the cylindrical body using an annular weld. However, it is very well known in the art that welded joints, or even brazed joints, in an air conditioning system receiver are subject to leakage, and, therefore, have not been totally satisfactory in service because of such phenomena.

It is also well known to use spin welding for pressure vessels in an air-conditioning circuit, as disclosed, for example, in U.S. Pat. Nos. 4,628,704; 4,675,971; 5,245,842; and 5,375,327.

The disclosures of the aforesaid U.S. Pat. Nos. 5,191,775; 5,425,250; 4,628,704; 4,675,971; 5,245,842; and 5,375,327 are incorporated by reference herein.

SUMMARY OF THE INVENTION

The foregoing and other problems of prior art refrigerant receivers are overcome by the receiver of the present invention, and by the method of its manufacture, in which an aluminum disk-shaped closure member, or puck, is secured to an initially open end of a generally cylindrical thin-walled aluminum body utilizing a spin welding process. The spin welding process of the present invention is preferably used in conjunction with a rolling operation to roll an annular portion of the wall of the cylindrical body into an annular recess in the exterior of the closure member to form a positive mechanical lock between the cylindrical body and the closure member. The positive mechanical lock between the closure member and the cylindrical body, which results from the rolling operation, serves to overcome the tendency of the closure member to eject from the receiver under significant internal pressure, and the spin welding step of the present invention results in a continuous, leak-free seam between the cylindrical body and the closure member, eliminating the need for an O-ring or other sealing member therebetween, and does so without using a conventional welding or brazing operation to form a seam between the closure member and the cylindrical body, thereby eliminating the known processing problems associated with any such conventional welding operation.

To effect the spin welding of the cylindrical body of the receiver of the present invention to the closure member, the closure member and the cylindrical body are provided with relatively thin annular flanges, which are spaced close to one another when the closure member and the cylindrical body are properly positioned for the beginning of the spin welding operation. In one embodiment of the present invention, the annular flanges of the closure member and the cylindrical body extend in a direction essentially parallel to a longitudinal central axis of the cylindrical body, in which case the spin welding step is preferably accomplished by spinning a spinning tool, whose axis of rotation is aligned with the longitudinal central axis of the cylindrical body, relative to the cylindrical body and the closure member while they are held in fixed positions. In another embodiment of the present invention, the annular flanges of the closure member and the cylindrical body extend substantially perpendicular to the longitudinal central axis of the cylindrical body, in which case the welding is preferably accomplished by rotating the closure member and the cylindrical body with respect to a tool moving rectilinearly along an axis that extends substantially perpendicular to the longitudinal central axis of the cylindrical body.

Accordingly, it is an object of the present invention to provide an improved pressure vessel of a type having a cylindrical body having a thin annular wall and a closure member inserted into an initially open end of the cylindrical body and secured thereto, as well as an improved method for manufacturing such a pressure vessel.

For a further understanding of the present invention and the objects thereof, attention is directed to the drawings and the following brief description thereof, to the detailed description of the preferred embodiment of the invention, and to the appended claims.

DETAILED DESCRIPTION OF THE PREFERRED EMBODIMENT

Figure 1:
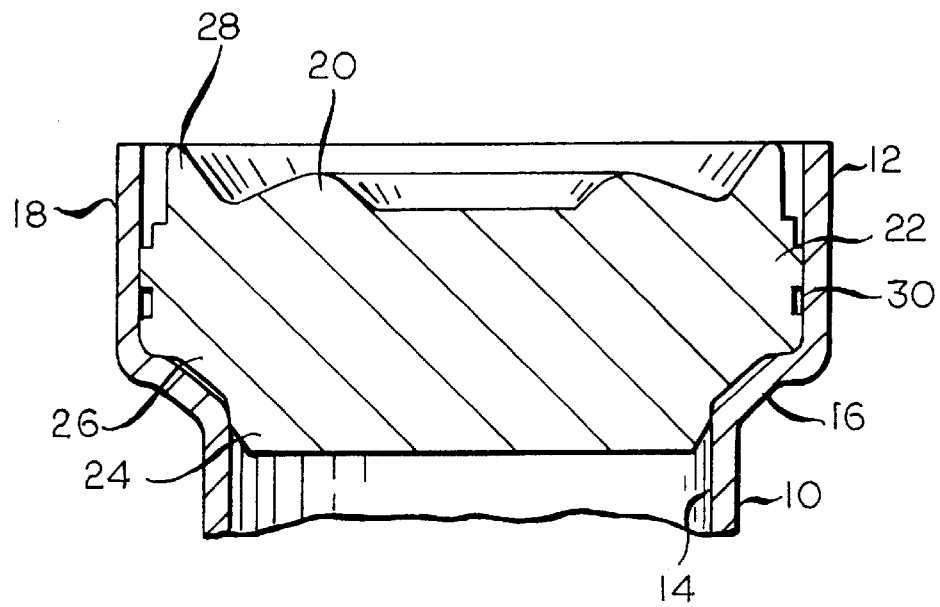
FIG. 1 is a fragmentary view, in cross section, of a cylindrical body with an initially open end that is to be closed by a closure member to produce a pressure vessel in accordance with the preferred embodiment of the present invention.

FIG. 1 illustrates a cylindrical body 10, shown fragmentarily, the cylindrical body 10 having an initially open end 12 and preferably being formed from aluminum or an aluminum alloy. The cylindrical body 10 has a thin annular wall 14, and the end 12 of the cylindrical body 10 is preferably enlarged, for example, by an impacting or expanding operation or as part of a deep draw process, such that the cylindrical body 10 preferably will have an outwardly projecting shoulder 16 which may, as illustrated in FIG. 1, also extend upwardly toward the open end 12.

The open end 12 of the cylindrical body 10 is to be closed by a closure or puck 20 that is inserted into the open end 12, and is later secured to the cylindrical body 10 as will be hereinafter described more fully. The closure 20 is formed of a material that is compatible with the material of the cylindrical body 10, so as to be weldable to the cylindrical body 10 by spin welding. Thus, the closure 20 is also preferably formed of aluminum or an aluminum alloy when the cylindrical body 10 is formed of such a material. In any case, the closure 20 is preferably formed in its illustrated complex configuration by machining in a known manner, and has a main body portion 22 that fits snugly within the open end 12 of the cylindrical body 10, a smaller end portion 24 and a shoulder 26 extending between the main body portion 22 and the end portion 24. Preferably, the shoulder 26 of the closure 20 extends substantially or approximately parallel to the shoulder 16 of the cylindrical body 10.

The closure 20 includes a relatively thin, annular flange 28 extending outwardly from the main body portion 22 of the closure 20 and substantially parallel to a longitudinal central axis of the cylindrical body 10. The annular flange 28 is spaced close to an outermost portion 18 of the initially open end 12 of the cylindrical body 10, for reasons which will be hereinafter described more fully. The axial position of the closure 20 relative to the open end 12 of the cylindrical body 10, and thus the axial position of the annular flange 28 relative to the outermost portion 18 of the open end 12, is preferably accurately fixed by the shoulder 16 of the cylindrical body 10, which limits the distance the closure 20 can be inserted into the cylindrical body 10.

Figure 2:
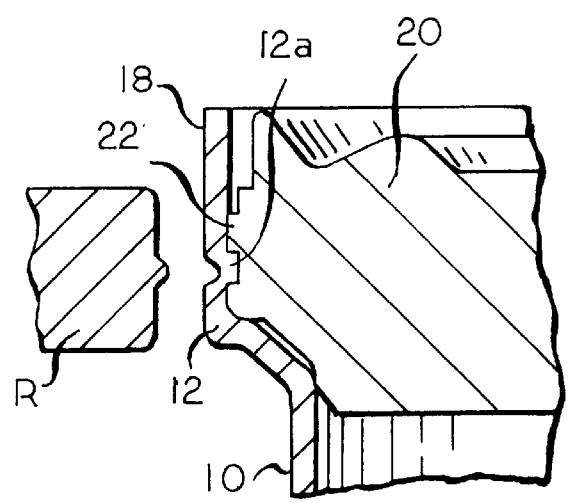
FIG. 2 is a fragmentary view, in cross section, schematically illustrating a processing step to be performed on the cylindrical body and closure of FIG. 1 to produce a receiver according to the preferred embodiment of the present invention from the cylindrical body and closure of FIG. 1.
Figure 3:
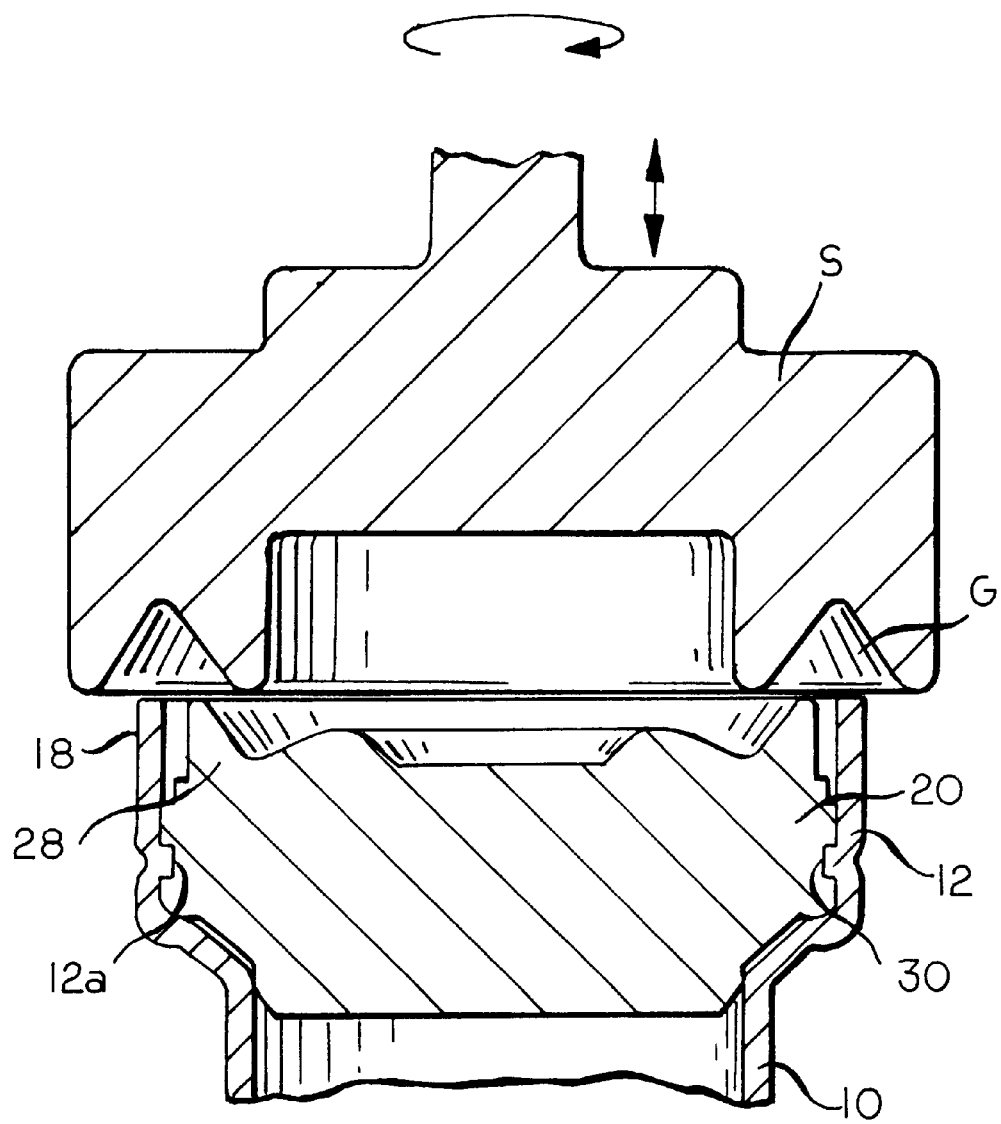
FIG. 3 is a fragmentary view, in cross section, schematically illustrating a subsequent processing step to be performed after the processing step of FIG. 2 to produce a receiver according to the preferred embodiment of the present invention from the cylindrical body and closure of FIG. 1.
Figure 4:
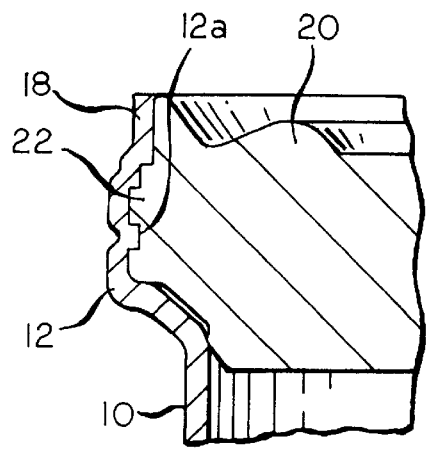
FIG. 4 is a view similar to FIG. 2 of the cylindrical body and closure of FIG. 1 after completion of the processing step illustrated in FIG. 3.

The main body portion 22 of the closure 20 is also provided with an annular groove 30. After the closure 20 is in the position shown in FIG. 1 relative to the cylindrical body 10, a rolling tool R preferably engages the exterior of the open end 12 of the cylindrical body 10, at a location in alignment with the annular groove 30, to roll a portion 12a of the open end 12 into the annular groove 30 as illustrated in FIG. 2. The engagement between the rolled portion 12a of the open end 12 of the cylindrical body and the annular groove 30 of the closure 20 serves to lock the closure 20 and the cylindrical body 10 to one another and prevent ejection of the closure 20 from the cylindrical body 10 as a result of positive pressure within the cylindrical body 10, which is common within a receiver for an automotive air conditioning system, the intended application for the combined cylindrical body 10 and closure 20 at the conclusion of the manufacturing operations to be performed thereon. However, it is possible to use any known technique, besides rolling, for forcing the portion 12a into the annular groove 30.

At the conclusion of the processing step illustrated in FIG. 2, the cylindrical body 10 and closure 20, now mechanically locked together but not sealed, are axially aligned with a spinning tool S, which is caused to spin at a relatively high rotational velocity about its central axis and is axially translated toward the cylindrical body 10 and closure 20, while the cylindrical body 10 is held in a fixed position, for example, in a conventional chuck, not shown. The axial advance of the spinning tool S gradually traps the outermost portion 18 of the open end 12 of the cylindrical body 10 and the annular flange 28 of the closure 20 in a generally V-shaped groove G of the spinning tool S to urge the outermost portion 18 and the annular flange 28 toward one another. The high rotational speed spinning of the spinning tool S relative to the fixed cylindrical body 10 generates heat sufficient to weld the outermost portion 18 and the annular flange 28 to one another in a continuous piece, which will be completely leak-free as opposed to a seam formed by brazing, a conventional process for joining aluminum components to one another, or by any other welding process.

It should be appreciated that it is also possible to further roll form the outermost portion 18 to further conform with the annular flange 28 prior to the spinning operation.

The nonillustrated end of the cylindrical body 10 that is opposed to the open end 12 is preferably integral to the annular wall 14, or further the cylindrical body 10 may be formed in a unitary one-piece configuration by a deep drawing operation as is known in the art. For example, the aforesaid U.S. Pat. No. 5,191,775 discloses such a one-piece body, which is identified by reference numeral 11 therein. Alternatively the nonillustrated end of the cylindrical body 10 may also be closed by a separate closure, not shown, similar to the closure 20 that is affixed to the open end 12 of the cylindrical body 10, and affixed thereto in a similar manner, as heretofore described.

While not illustrated, it is to be understood that the closure 20 may be, and preferably is, provided with openings extending therethrough to permit necessary inlet and outlet tubes, not shown, to be affixed to the closure 20 for the purpose of permitting refrigerant fluid to flow into and out of the cylindrical body 10, as is also shown, for example, in the aforesaid U.S. Pat. No. 5,191,775.

Figure 5:
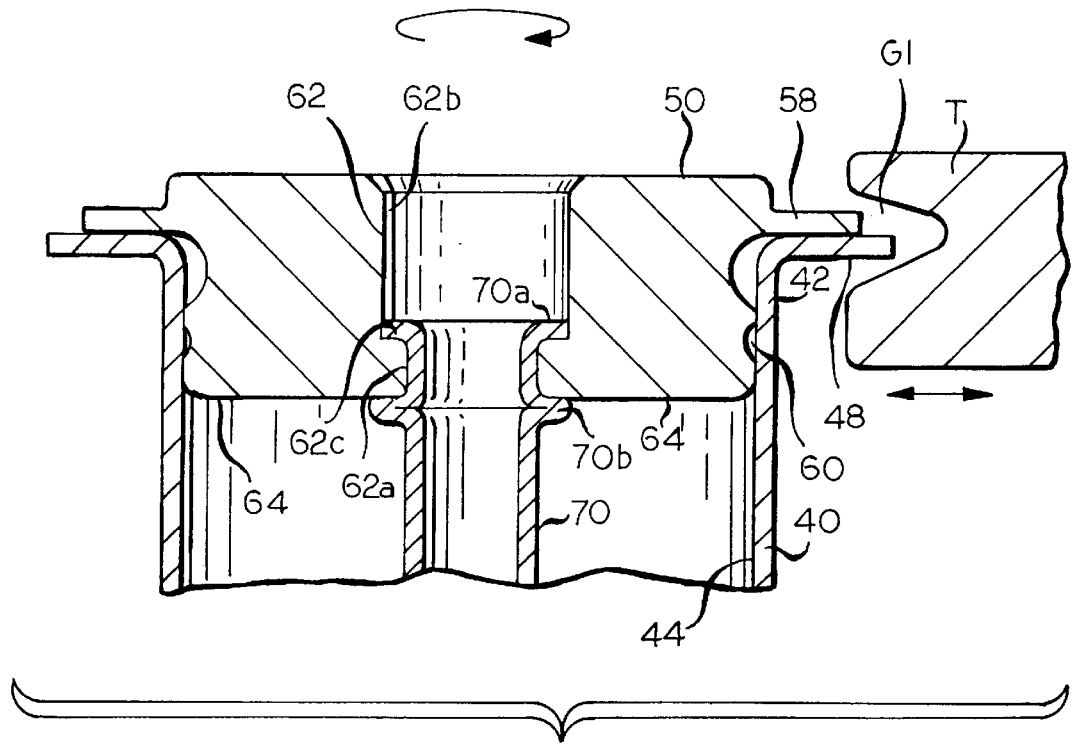
FIG. 5 is a view similar to FIG. 1 of an alternative embodiment of a cylindrical body and a closure to be joined to one another to produce a receiver in accordance with an alternative embodiment of the present invention.

FIG. 5 illustrates a vessel that is made up of a cylindrical body 40 with an initially open end 42. The cylindrical body 40 is preferably formed of aluminum or an aluminum alloy and is defined by an annular wall 44. The free end of the initially open end 42 of the cylindrical body 40 is provided with a radially outwardly projecting annular flange 48. A closure 50, which is also preferably formed of aluminum or an aluminum alloy and preferably by machining, has a radially outwardly projecting annular flange 58, and is inserted into the open end 42 of the cylindrical body 40 until the radial flange 58 of the closure 50 abuts against the radial flange 48 of the cylindrical body 40 and the radial flanges 48 and 58 are aligned for further processing.

The closure 50 also has an annular groove 60 in its exterior side, similar to the annular groove 30 of the closure 20 of the embodiment of FIGS. 1 through 4, and the annular wall 44 of the cylindrical body 40 preferably is rolled into the annular groove 60 to positively lock the closure 50 and the cylindrical body 40 to one another, though such step is not positively illustrated in FIG. 5. Moreover, the closure 50 has an opening 62 extending therethrough, the opening 62 having a small diameter innermost portion 62a and a larger diameter outermost portion 62b, separated by an annular shoulder 62c. An annular tube 70 is inserted into the cylindrical body 40 through the opening 62 to introduce refrigerant fluid into the cylindrical body 40. The tube 70 has an outermost annular flange 70a that abuts against the annular shoulder 62c of the opening 62, and a bead 70b that abuts against an inner surface 64 of the closure 50 to positively position the tube 70 axially with respect to the closure 50. The bead 70b may be formed using any known process such as cold forming or, preferably, rolling.

To form a leak-free seal between the closure 50 and the cylindrical body 40, and specifically between the annular flange 48 and the annular flange 58, the assembly of the cylindrical body 40 and the closure 50 is caused to spin about the longitudinal central axis of the cylindrical body 40 at a relatively high rotational velocity, and a translating tool T is advanced toward the annular flange 48 and the annular flange 58 while the cylindrical body 40 and the closure 50 are rotating. The tool T has a generally V-shaped groove G1 that engages the annular flange 48 and the annular flange 58 while they are spinning, to generate a level of heat that will cause the annular flange 48 and the annular flange 58 to fuse, or weld, to one another to eliminate any potential leak path for the molecules of the refrigerant fluid. A pressure vessel formed by the method of FIG. 5 will, thus, have an external lip that can be used to facilitate the assembly of such a pressure vessel to an automotive vehicle as well as provide a sealed, secured pressure vessel.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A method of forming a vessel, having a longitudinal central axis from a cylindrical body and a closure member, said cylindrical body having an annular wall and an open end portion having an enlarged diameter, said closure member having an annular flange and a circumferential groove in an outer wall of said closure member, said method comprising the steps of:
   positioning said closure member in said enlarged diameter open end portion of said cylindrical body with said annular flange of said closure member positioned near said annular wall of said cylindrical body;
   rolling inwardly an annular portion of said annular wall of said cylindrical body into said circumferential groove in said outer wall of said closure member to lock said closure member and said cylindrical body to one another;
   providing a tool having a groove, said groove of said tool engaging said annular flange of said closure member and said open end portion of said cylindrical body; and
   causing rapid relative rotation between said tool and said cylindrical body while said tool engages said open end portion of said cylindrical body and said annular flange of said closure member to produce sufficient heat to fuse said annular flange of said closure member to said open end portion of said cylindrical body.

2. The method according to claim 1 wherein said annular flange of said closure member is coaxial with said longitudinal central axis of said cylindrical body, said open end portion of said cylindrical body is an outermost portion of said annular wall and extends coaxial with said longitudinal central axis of said cylindrical body, and said rapid relative rotation is caused by spinning said tool while holding said cylindrical body and said closure member fixed against rotation during said spinning of said tool.

3. The method according to claim 1 wherein said open end portion of said cylindrical body has said enlarged diameter portion, an inner portion and an annular shoulder joining said enlarged diameter portion and said inner portion, and wherein said step of positioning said closure member includes inserting said closure member into said open end portion of said cylindrical body to a depth that is limited by said annular shoulder.

4. The method according to claim 1 wherein said annular flange of the closure member extends generally perpendicular to said longitudinal central axis of said cylindrical body, and wherein said open end portion of said cylindrical body is an annular flange extending generally perpendicular to said longitudinal central axis of said cylindrical body, said method further comprising the steps of:
   spinning said cylindrical body and said closure member relative to said tool having said groove, said tool being fixed against rotation; and
   moving said tool linearly with respect to said spinning cylindrical body.

* * * * *